United States Patent
Green et al.

(10) Patent No.: US 6,910,673 B2
(45) Date of Patent: Jun. 28, 2005

(54) VALVE WITH CALIBRATED FLOW ORIFICE INSERT

(75) Inventors: James W. Green, Olive Branch, MS (US); Gino James Rouss, Bartlett, TN (US)

(73) Assignee: Valve Teck, Inc., Memphis, TN (US)

(*) Notice: Subject to any disclaimer, the term of this patent is extended or adjusted under 35 U.S.C. 154(b) by 66 days.

(21) Appl. No.: 10/352,329

(22) Filed: Jan. 27, 2003

(65) Prior Publication Data

US 2003/0141480 A1 Jul. 31, 2003

Related U.S. Application Data

(60) Provisional application No. 60/352,439, filed on Jan. 28, 2002.

(51) Int. Cl.[7] .................................. F16K 5/06
(52) U.S. Cl. .................. 251/118; 251/315.01
(58) Field of Search .......................... 251/315.01, 118, 251/315.1, 315.11; 138/44

(56) References Cited

U.S. PATENT DOCUMENTS

| | | | |
|---|---|---|---|
| 1,493,409 A | 5/1924 | Wiley | |
| 3,126,917 A | 3/1964 | Hodgeman et al. | 138/44 |
| 3,220,694 A * | 11/1965 | Eschbaugh | 251/192 |
| 3,386,461 A | 6/1968 | Fisher | |
| 3,760,836 A * | 9/1973 | Albanese | 251/315.01 |
| 4,068,822 A * | 1/1978 | Richards | 251/315.14 |
| 4,085,774 A | 4/1978 | Baumann | 137/625.3 |
| 4,402,485 A * | 9/1983 | Fagerlund | 138/44 |
| 4,903,725 A | 2/1990 | Ko | 137/454.5 |
| 4,960,260 A | 10/1990 | McEnearney | 251/127 |
| 5,074,522 A | 12/1991 | Reynolds et al. | 251/127 |
| 5,123,628 A | 6/1992 | Yu | 251/209 |
| 5,315,859 A | 5/1994 | Schommer | 73/3 |
| 5,316,264 A * | 5/1994 | Newman et al. | 251/150 |
| 5,533,549 A * | 7/1996 | Sherman | 251/315.14 |
| 5,655,571 A | 8/1997 | Gawlik | 138/44 |
| 5,687,770 A | 11/1997 | Sharp | 138/44 |
| 5,819,803 A | 10/1998 | Lebo et al. | 138/42 |
| 5,911,405 A * | 6/1999 | Korczynski et al. | 251/315.11 |
| 5,937,890 A | 8/1999 | Marandi | 137/271 |
| 6,035,897 A * | 3/2000 | Kozyuk | 138/44 |
| 6,039,304 A | 3/2000 | Carlson et al. | 251/209 |

OTHER PUBLICATIONS

Belimo Aircontrols (USA), Inc., "The Difference Is in the Details" (date unknown).
Griswold Controls, Inc., "HVAC Technology Review" (date unknown).

* cited by examiner

Primary Examiner—John Bastianelli
(74) Attorney, Agent, or Firm—Walker, McKenzie & Walker, P.C.

(57) ABSTRACT

A valve with a calibrated flow orifice insert for use in Heating, Ventilation, and Air Conditioning ("HVAC") applications so as to provide metered flow through the valve. The insert is used as a flow control device and is inserted into a conventional threaded ball valve. The insert has a cylindrical axial bore that is sized to provide a maximum valve flow coefficient. Peripheral threads on the insert mate with interior threads on the inlet of the valve body. A pair of bores on the face of the insert permit threaded insertion into the valve. The axial orifice bore through the insert is sized using experimentally-determined formulas related to the Reynolds numbers for the orifice and for the piping upstream of the insert.

9 Claims, 5 Drawing Sheets

VALVE WITH CALIBRATED FLOW ORIFICE INSERT

CROSS REFERENCE TO RELATED APPLICATIONS

This application is a non-provisional counterpart of pending U.S. Provisional Patent Application No. 60/352,439, filed Jan. 28, 2002, fully included by reference herein, and claims priority benefit thereof.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to valves used in the commercial heating, refrigeration, and air conditioning industry, and in particular, to valves for precisely metering the flow of fluid therethrough.

2. Information Disclosure Statement

It is often desired to achieve constant flow control when dealing with a fluid used in any Heating, Ventilation & Air Conditioning ("HVAC") application. Well-known solutions for this problem include the use of linear globe valves. A linear globe valve uses a multi-turn handwheel that operates a linear rising-stem control element, which closes onto a seating surface. A complex flow path through the valve, along with the linear rising-stem, allows the globe valve to possess important key features. One key feature is the high level of precision when throttling. Another key feature is the inherent rangeability, which is defined as the ratio of the maximum flow to the minimum controllable flow through the valve passage. Also, the inherent flow characteristics of the linear globe valve allows it to exhibit "equal percentage flow," i.e., an inherent flow characteristic which, for equal increments of rated travel, will ideally yield equal percentage changes of the existing flow.

Unfortunately, some inherent disadvantages still remain with the linear globe valve design. One disadvantage with this type of valve is that it contains a contoured plug that works in conjunction with a metal seat. When the plug is pressed against the metal seat, there is no sealing surface to close against; thus there is wasted energy, or in this case leakage. Other recognized disadvantages with the linear globe valve design include a high pressure drop across the valve due to a restricted flow passage when the valve is fully open, and the need for a sufficient amount of space in order to open the valve, because it is controlled by a rising-stem. These undesirable factors must be taken into consideration when using this valve in any piping system.

In order to maintain all of the admirable performance characteristics of the linear globe valve without having to deal with considerably high-pressure losses, modified ball valves may be used in place of globe valves. FIG. 1 shows such a typical well-known conventional ball valve 20 having a threaded inlet port 22 and outlet port 24, each port having internal threads 26 of standard pitch and size for receiving similarly-threaded pipes (not shown) therewithin in a manner well-known to those skilled in the art. FIG. 9 shows another typical well-known conventional ball valve 2.20 having non-threaded inlet and outlet ports 2.22, 2.24 into which inlet and outlet pipes P are soldered in a manner well-known to those skilled in the art. Other than the threaded/non-threaded aspect of the ports, the prior art valves of FIGS. 1 and 9 are otherwise substantially the same, and a description of the valve of FIG. 1 will suffice for both, it being understood that similar structural features perform similar functions for both types of valves.

Well-known ball valve 20 includes a valve body 28, usually of a metal such as brass or stainless steel, a generally spherical ball 30, typically of a metal such as brass or chrome or stainless steel and having a transverse cylindrical bore 32 therethrough. Ball 30 is mounted for rotation with a metal stem 34, typically brass or stainless steel, about a vertical axis of stem 34 such that a 90° rotation of stem 34 about its axis causes ball valve 20 to go from a fully-closed position (shown in dotted outline) in which the cylindrical bore 32 of ball 30 is transverse to the axis of input and output ports 22, 24, to a fully-open position (shown in solid outline) in which the cylindrical bore 32 is aligned with the axis of input and output ports 22, 24. Stem 34 is typically mounted in a polytetrafluoroethylene ("PTFE") polymer (often sold under the trademark TEFLON) stem bearing 36 within Namur mount 40 of like metal as valve body 28 for rotation of stem 34 with respect to valve body 28, and stem 34 may be sealed with a PTFE polymer stem seal 38 and one or more Viton O-rings 42. Typically, a well-known electrically-operated actuator (not shown) is coupled to stem 34 so as to cause the ball valve 20 to cycle between its open and closed positions in a manner well-known to those skilled in the art.

Pressure losses across these valves are small compared to those in globe valves. They exhibit excellent performance for on/off service, and the amount of shut-off leakage around the spherical control element of the ball valve is minimal, which allows for positive shut-off. Positive shut-off is referred to by the American National Standards Institute as a Class VI, "bubble tight" situation, which means that when the valve was tested under laboratory conditions with compressed air, no leakage was observed. Standard ball valves possess many excellent features, but do not exhibit desirable flow control. The advantage of using modified ball valves over the traditional style linear globe valves includes similar flow characteristics while making quarter-turn automation simple and economical.

Several different modified ball valves have been introduced to the valve industry in the last few years. A ball valve that uses a polymer insert to achieve equal percent flow characteristics is sold under the trademark OPTIMIZER by Griswold Controls, Inc., 2803 Barranca Pkwy, Irvine, Calif., and is described in a Griswold brochure entitled "HVAC Technology Review—Griswold Controls Introduces Optimized Temperature Control," and in Mirandi, U.S. Pat. No. 5,937,890 (issued Aug. 17, 1999), fully included herein by reference. The Griswold OPTIMIZER ball valve insert is an insert that is press-fit into the spherical control element. It allows for multiple valve flow coefficient ($C_v$) selection for the user. The OPTIMIZER ball valve insert is designed for use in the manufacturer's valve only. Temperatures and pressures in the system must be limited due to the fact that the insert is made of a polymer material and could fail under certain conditions. Because of this problem, steam can not be used as the working fluid in the system. Fouling can also be a problem with the discs designed to yield smaller valve flow coefficient ($C_v$) values. With the narrow design of the parabolic shape of the orifice, small pieces of debris within the system could get trapped, disrupting the flow through the orifice and minimizing control. Due to the press fit design, the insert could become loose and potentially removed under high pressure.

Other attempts to address the poor control of a standard ball valve are ball valves with a disk insert sold under the trademark "Characterized Control Valves" and manufactured by Belimo Aircontrols (USA) Inc., 43 Old Ridgebury Road, Danbury, Conn. The disk insert is made of polytetrafluoroethylene ("PTFE") polymer material, such as that sold under the trademark TEFLON, and is placed in the valve body upstream of the control element. The disk insert is held in place by the use of a retaining ring. Like the Optimizer, this control device can only be used in the manufacturer's valve. As with the Optimizer design, the PTFE insert could fail under high pressures and temperatures, the smaller parabolic orifice passages could become obstructed, and the insert could become loose and possibly removed under high pressure because of the simple retaining ring used to hold the insert in position. These Characterized Control Valves are described in a Belimo Aircontrols brochure entitled "The Difference is in the Details" and also are described in Carlson et al., U.S. Pat. No. 6,039,304 (issued Mar. 21, 2000), fully included herein by reference.

A ball valve that uses a one-piece lubricant-impregnated metal seat and is configured to provide a concave central surface portion that makes full-face direct sealing contact with the ball is sold by Worcester Controls Corporation, Marlboro, Mass., and is described in Reynolds et al., U.S. Pat. No. 5,074,522 (issued Dec. 24, 1991), fully included herein by reference. This design improves the flow control of a standard ball valve, but is an expensive alternative when compared with other designs in the industry. The Worcester valve is designed specifically for high pressure industrial applications, and is limited in regards to maximum $C_v$ due to the specified geometry of the designed metal seats. When dealing with high pressure situations, the ball valve design must include very tight direct sealing contact between the spherical control element and the seats that are located adjacent the upstream and downstream sides of the valve within the valve housing. Due to the tight seal between the control element and the seats, the torque that is necessary to rotate the control element is greater than that found in a modified ball valve used in HVAC applications. In order to use automation to control the Worcester valve, expensive actuators would have to be used that have high torque capabilities. Fouling can also be a problem when a metal seat is used containing several small holes to regulate the flow. Debris can block several of the holes, changing the characteristics of the design, and limiting flow control It is therefore desirable to have a flow control device that is intended to obviate problems of the types discussed above with respect to the Griswold, Belimo, and Worcester valve arrangement.

In addition to the Griswold Controls, the Belimo Aircontrols, and the Worcester Controls Corporation references mentioned above, the inventor also is aware of the following patent references, some of which may be relevant to the present invention: Wiley, U.S. Pat. No. 1,493,409, issued May 6, 1924; Hodgeman et al., U.S. Pat. No. 3,126,917, issued Mar. 31, 1964; Baumann, U.S. Pat. No. 4,085,774, issued Apr. 25, 1978;Ko, U.S. Pat. No. 4,903,725, issued Feb. 27, 1990; McEnearney, U.S. Pat. No. 4,960,260, issued Oct. 2, 1990; Yu, U.S. Pat. No. 5,123,628, issued Jun. 23, 1992; Schommer, U.S. Pat. No. 5,315,859, issued May 31, 2994; Gawlik, U.S. Pat. No. 5,655,571, issued Aug. 12, 1997; Sharp, U.S. Pat. No. 5,687,770, issued Nov. 18, 1997; and Lebo et al., U.S. Pat. No. 5,819,803, issued Oct. 13, 1998.

None of these references, either singly or in combination, are believed to disclose or suggest the present invention.

BRIEF SUMMARY OF THE INVENTION

The present invention is an insert that is used as a flow control device and can be retrofitted into any conventional threaded ball valves. The insert includes a concentric orifice that can be formed to different sizes to provide the desired maximum valve flow coefficient, or $C_v$. The orifice insert consists of standard National Pipe Taper ("NPT") threads, which are sized to mate with a predetermined valve size. When installed into the valve body, the external straight threads on the insert interlock with the tapered threads within the valve body creating a secure locking mechanism. This method of installation will prevent the insert from becoming loose and possibly removed when encountered by high pressures and temperatures. The orifice insert may be machined from brass, carbon steel, stainless steel and other alloys, depending upon the particular application. These materials are able to withstand rather high pressures and temperatures without failing, which enables the flow control device to be used for steam applications. The axial concentric orifice design allows a conventional ball valve to become an excellent control valve. The designed orifice insert allows the ball valve to exhibit true "equal percentage flow characteristics" over the entire 90° rotation, and the rangeability of the valve is greatly improved. Fouling is almost eliminated with the centrally disposed single orifice machined in each insert. The present design does not require very tight direct sealing contact between the spherical control element and the PTFE seats that are located adjacent the upstream and downstream sides of the ball valve within the valve housing. This makes quarter-turn automation simple and economical because the need for high-torque actuators is eliminated.

DETAILED DESCRIPTION OF THE INVENTION

Figure 1:
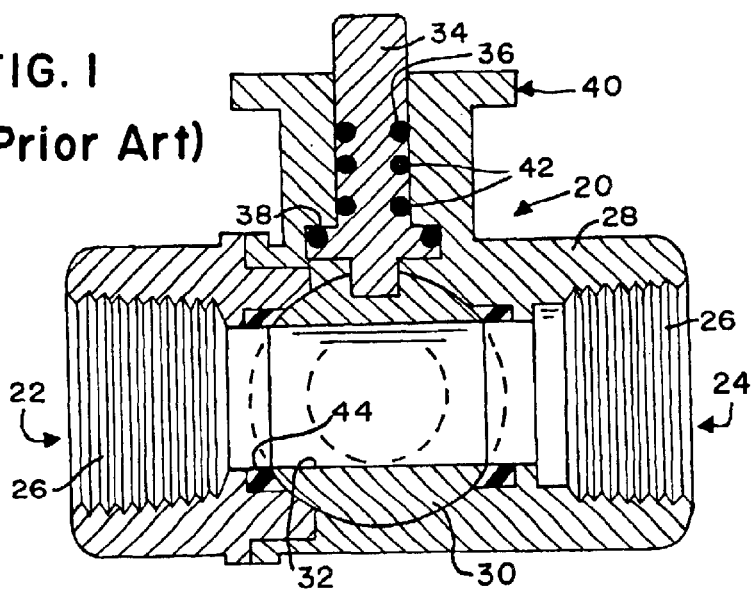
FIG. 1 is a longitudinal side sectional view of a conventional well-known ball valve having threaded inlet and outlet ports.
Figure 2:
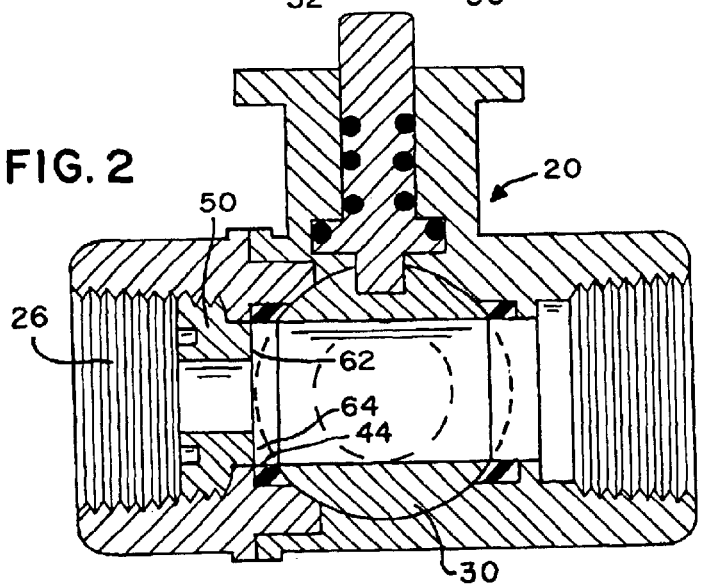
FIG. 2 is a longitudinal side sectional view of the prior art ball valve of FIG. 1 into which the calibrated flow orifice insert of the present invention has been fitted.
Figure 3:
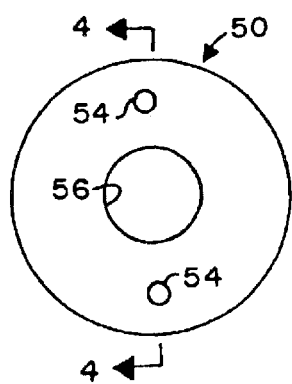
FIG. 3 is an end view of the calibrated flow orifice insert of the present invention.
Figure 4:
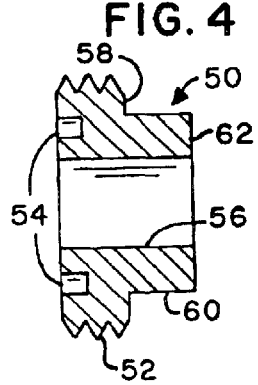
FIG. 4 is a longitudinal sectional view of the calibrated flow orifice insert of the present invention, taken substantially along the line 4—4 shown in FIG. 3.
Figure 5:
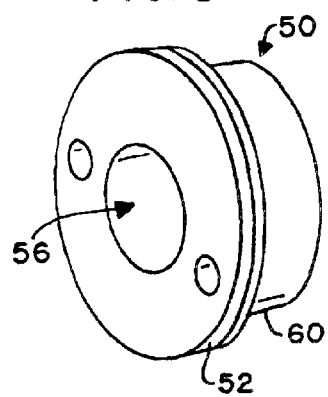
FIG. 5 is a perspective view of the calibrated flow orifice insert of the present invention.
Figure 9:
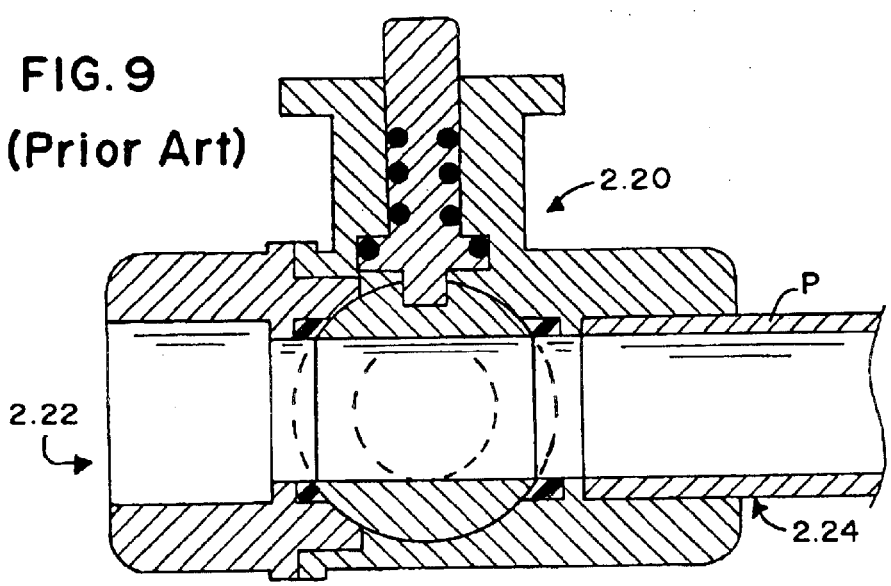
FIG. 9 is a longitudinal side sectional view of a conventional well-known ball valve having non-threaded inlet and outlet ports into which inlet and outlet pipes are soldered.
Figure 10:
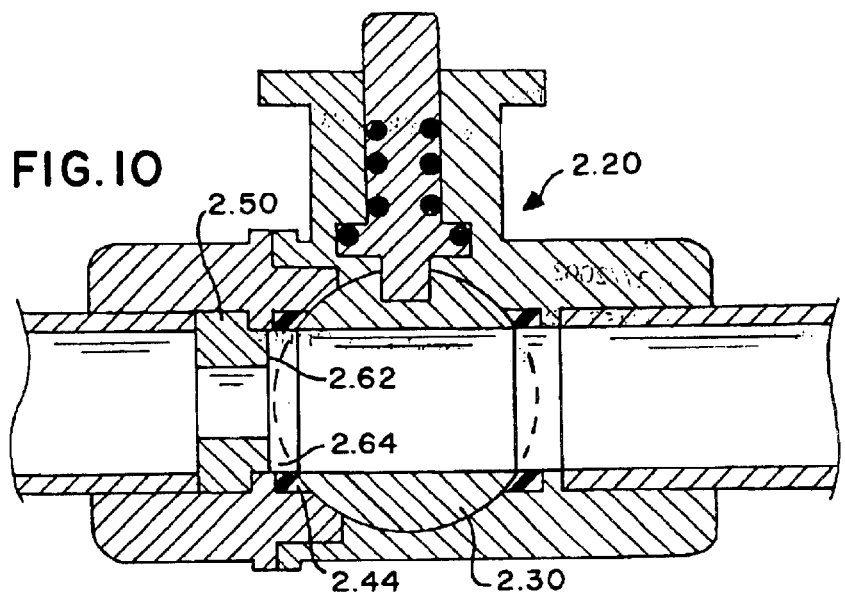
FIG. 10 is a longitudinal side sectional view of the prior art ball valve of FIG. 9 into which a second embodiment of the calibrated flow orifice insert of the present invention has been fitted.
Figure 11:
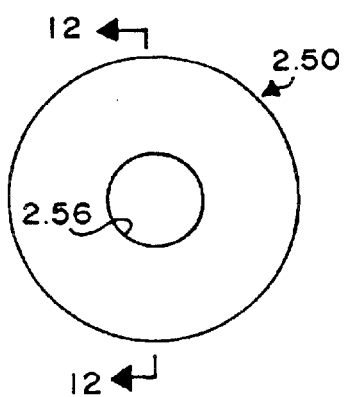
FIG. 11 is an end view of the second embodiment of the calibrated flow orifice insert of the present invention.
Figure 12:
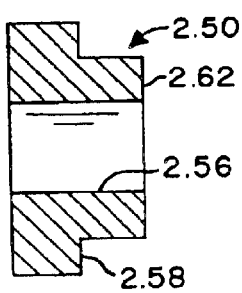
FIG. 12 is a longitudinal sectional view of the second embodiment of the calibrated flow orifice insert of the present invention, taken substantially along the line 12—12 shown in FIG. 11.
Figure 13:
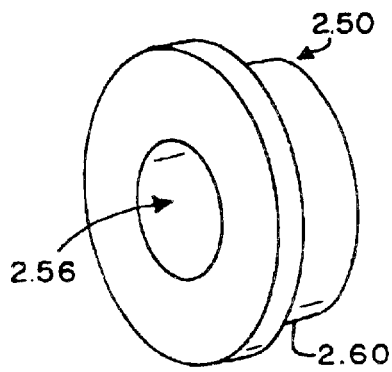
FIG. 13 is a perspective view of the second embodiment of the calibrated flow orifice insert of the present invention.

Referring to FIGS. 1 through 5 and 9 through 13, the present invention provides a flow control device, such as insert 50 and 2.50, which may easily be retrofitted into conventional prior art threaded ball valves 20 and unthreaded ball valves 2.20, upstream of the spherical control element or ball 30, 2.30 by securing with either a retaining ring, press fitting, gluing, soldering, or threading. As explained hereinabove, prior art ball valve 20 shown in FIG. 1 is substantially the same as prior art ball valve 2.20 shown in FIG. 9, the only difference being that well-known ball valve 20 has internally-threaded inlet and outlet ports 22, 24 for threadedly receiving similarly-threaded pipes (not shown) therewithin, whereas well-known ball valve 2.20 has non-threaded inlet and outlet ports 2.22, 2.24 into which non-threaded pipes P are soldered in a manner well-known to those skilled in the art. Other than the threaded/non-threaded aspect of the ports, the prior art valves of FIGS. 1 and 9 are otherwise substantially the same, and a description of the valve of FIG. 1 will suffice for both, it being understood that similar structural features perform similar functions for both types of valves. For clarity, similar structural features of ball valve 2.20 are given the same reference numerals as those of ball valve 20 except with a prefix "2.". Likewise, the first embodiment insert 50 of the present invention, for use with threaded ball valve 20, has many structural features that are similar to those of the second embodiment insert 2.50 of the present invention, which is for use with the non-threaded ball valve 2.20. Again, for clarity, similar structural features of insert 2.50 are given the same reference numerals as those of insert 50 except with a prefix "2." and a description of insert 50 will suffice for the common structural features of both, with differences between the two embodiments being discussed hereinafter.

Orifice inserts 50 are substantially cylindrically symmetric and have a disk-like flange 58 that is circumferentially threaded with well-known and standard NPT threads 52 that are sized to mate with the internal inlet port threads 26 for a predetermined valve size, which may typically vary from one-half inch to two inches (1.3 to 5.1 cm) in inner diameter. There are two alignment/insertion/removal holes 54 on the face of flange 58 of orifice insert 50 to allow for easy threadable installation into the valve 20. The orifice inserts 50, having external straight threads 52 disposed about the periphery thereof interlock with the tapered threads 26 within the valve body 28 creating a secure locking mechanism. A centrally disposed and axially-aligned orifice or bore 56 is formed in the flow control device insert 50 to provide the desired valve flow coefficient, or $C_v$. The orifice 56 may be sized to meet specific flow control requirements and eliminates the need for multiple pipe reducers to achieve the same results. The orifice 56 acts as a fixed mechanical flow limiter that allows only the new desired flow to exit the ball valve 20 no matter what the previous maximum valve flow coefficient $C_v$ the manufacturer has incorporated into the design of the valve 20. As the diameter of the orifice 56 is selected to be larger or smaller, a desired maximum valve flow coefficient $C_v$ can be achieved. The outcome of the combination of a standard ball valve 20 and the insert 50 of the present invention is a valve that has an infinite range of valve flow coefficients ($C_v$) that are lower than the valve's maximum rated flow coefficient ($C_v$), depending on the diameter of orifice 56 that is selected for the insert 50. This gives the operator the ability to obtain the control that is necessary in the HVAC industry. There is an elongated cylindrical rear section 60 that extends rearwardly from orifice insert 50. When the flow control device insert 50 is placed within the valve body 28, the rear end of the elongated section 60 aligns with the PTFE polymer seat 44 to form a passage that directs the flow into the spherical control element 30. Note however, as seen best in FIG. 2, that the rear face 62 of elongated rear section 60 must not extend too far rearwardly because otherwise it might contact ball 30 when the ball 30 is rotated so as to close the valve, as shown in dotted outline. It has been found that the small gap or chamber 64 between the rear face of insert 50 and ball 30 when the valve is in the opened position does not substantially impair the performance of the valve. The orifice insert 50 may be machined from brass, carbon steel, stainless steel and other alloys, depending upon the particular application.

After testing different size orifice inserts under controlled laboratory conditions, the valve coefficients can be determined using the experimental results of this testing. Once the valve coefficient ($C_v$) values have been determined, the Reynolds number for each specimen can be calculated and graphed. The graphs of FIGS. 6, 7, and 8 were developed with the Reynolds number through the orifice insert ("$Re_{do}$") on the vertical axis, and the Reynolds number through the upstream piping ("$Re_{Di}$") on the horizontal axis. With the graphs constructed, a polynomial trend line was used to fit all of the data points plotted within each graph and to determine the coefficients of a third-order equation that best fits the experimental data for various sizes of ball valve inner diameters. Using polynomial equations to calculate the orifice diameter for the 0.5 to 2.0 inches (1.3 to 1.5 cm) valve sizes, the maximum error encountered was 7.1%, with an average error of 2%. The generalized third-order "best fit" polynomial for each graph is of the form:

$$Re_{do}=K_3(Re_{Di})^3+K_2(Re_{Di})^2+K_1(Re_{Di})^1+K_0$$

The correct sizing of the orifice 56 in the flow control device insert 50 can then be found using this best-fit third-order equation for the experimental data for the particular size of ball valve inner diameter, where $Re_{do}$ is the Reynolds number through the orifice and $Re_{Di}$ is the Reynolds number through the upstream piping.

Figure 6:
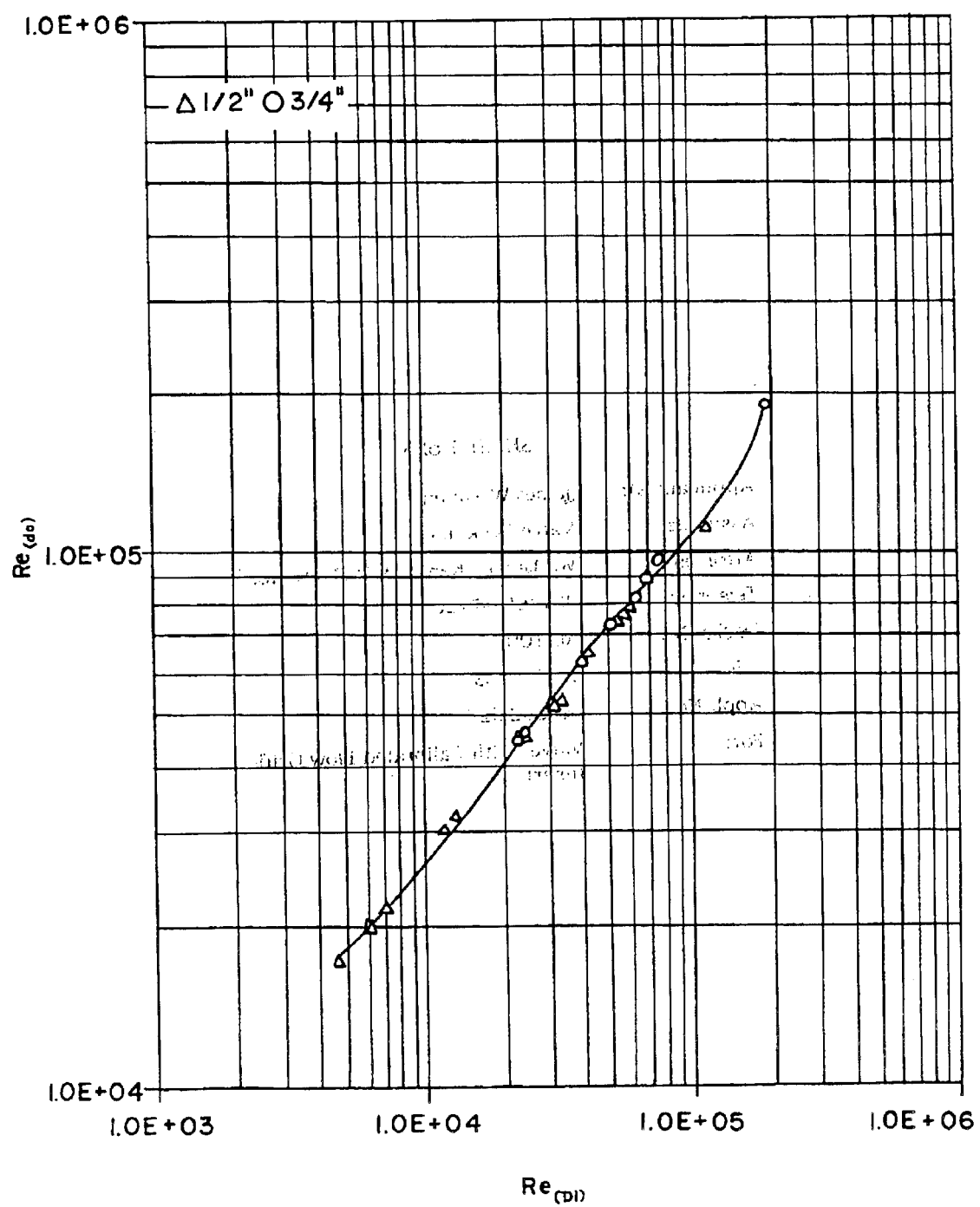
FIGS. 6, 7, and 8 are graphs of the Reynolds number through the orifice ("$Re_{d_o}$") versus the Reynolds number through the upstream piping ("$Re_{D_i}$") for various sizes of pipe.

For ball valve inner diameters between about 0.5 to 0.75 inches (1.3 to 1.9 cm) inclusive, whose graph is shown in FIG. 6, the polynomial coefficients for the best-fit third-order equation are determined to be:

$$K_3=4\times10^{-11}, K_2=-1\times10^{-5},$$
$$K_1=1.756, K_0=9687.80$$

such that $$Re_{do} = 4\times10^{-11}(Re_{Di})^3 - 1\times10^{-5}(Re_{Di})^2 + 1.756(Re_{Di}) + 9687.80$$

Figure 7:
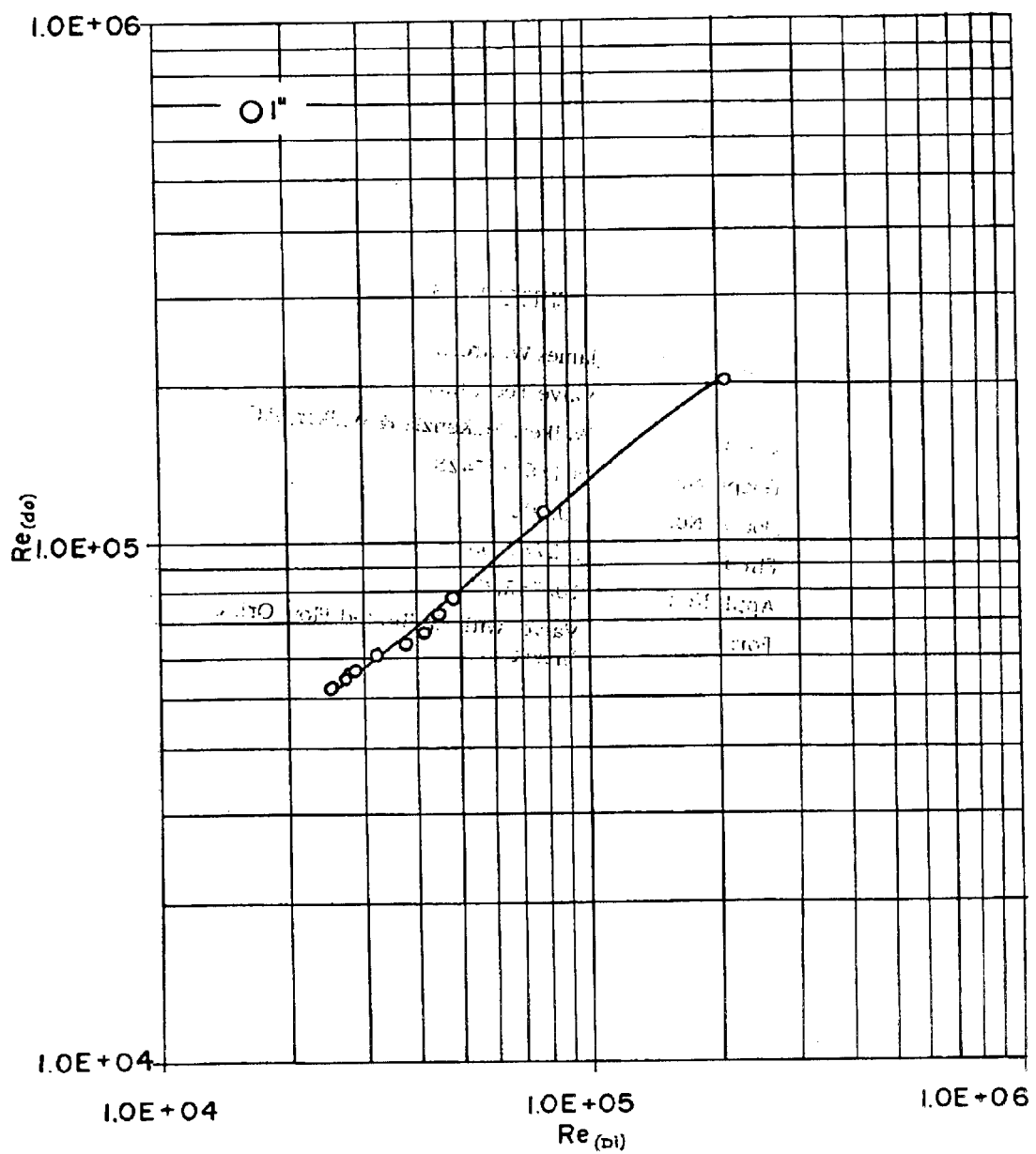

For a ball valve inner diameter of substantially 1.0 inch (2.5 cm), whose graph is shown in FIG. 7, the polynomial coefficients for the best-fit third-order equation are determined to be:

$$K_3=0, K_2=-2\times10^{-6}, K_1=1.32, K_0=18983$$

such that $$Re_{do}=-2\times10^{-6}(Re_{Di})^2+1.32(Re_{Di})+18983$$

Figure 8:
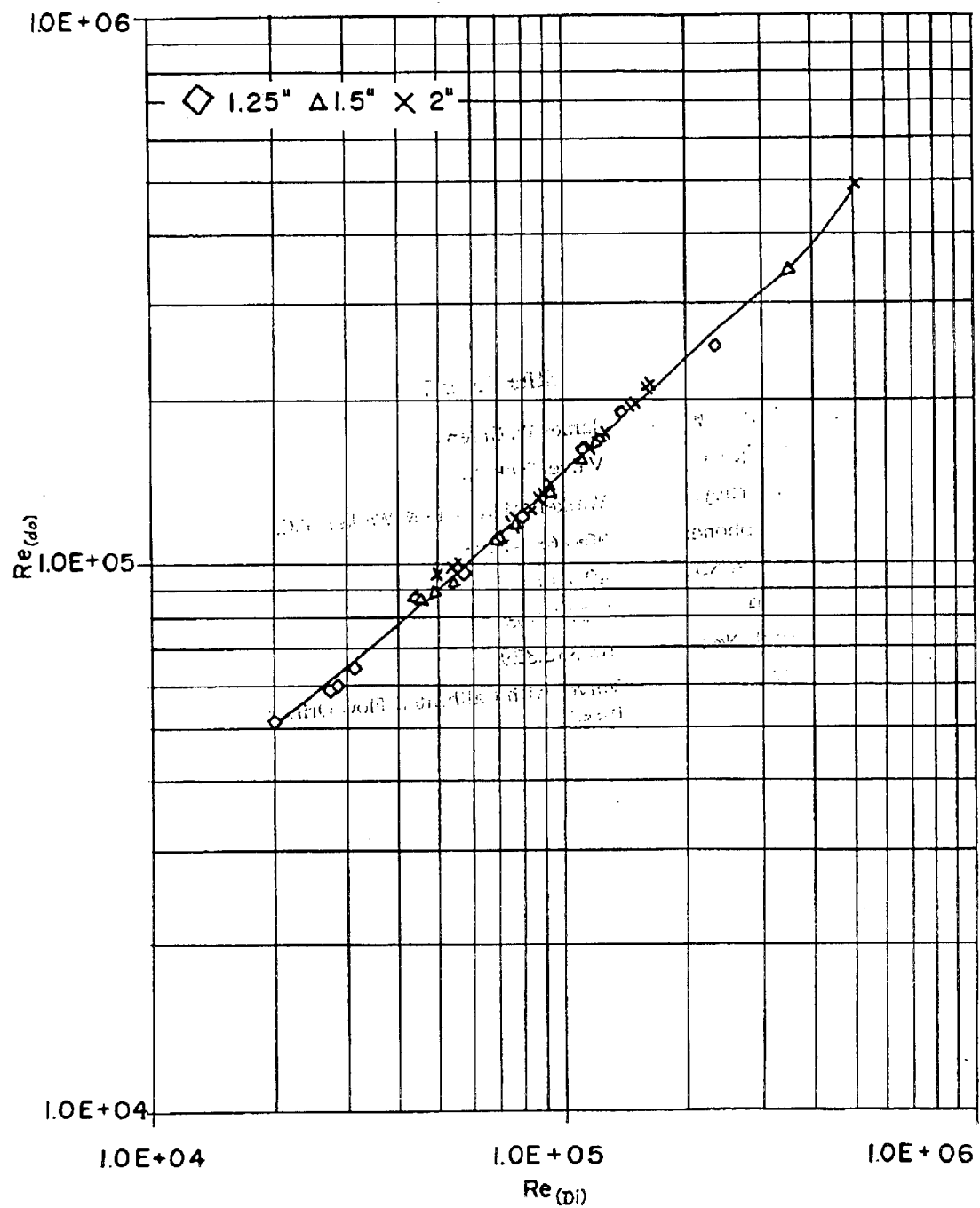

For a ball valve inner diameter of 1.25, 1.5 and 2.0 inches (3.2, 3.8 and 5.1 cm) and thus between about 1.25 to 2.0 inches (3.2 to 5.1 cm) inclusive, whose graph is shown in FIG. 8, the polynomial coefficients for the best-fit third-order equation are determined to be:

$$K_3 = 3 \times 10^{-12}, K_2 = -3 \times 10^{-6},$$

$$K_1 = 1.51, K_0 = 21643$$

such that $$\text{Re}_{do} = 3 \times 10^{-12} (\text{Re}_{Di})^3 - 3 \times 10^{-6} (\text{Re}_{Di})^2 + 1.51 (\text{Re}_{Di}) + 21643$$

The Reynolds number is a dimensionless ratio of inertia forces to viscous forces in the flow. It is a widely accepted and easily recognized ratio that is commonly used in fluid mechanics.

The Reynolds number can be calculated for the flow through the orifice using the following equation:

$$\text{Re}_{do} = \frac{4Q}{\pi d_o v}$$

Where:

Q=volume flow rate through orifice $d_0$=diameter of orifice in insert v=kinematic viscosity of fluid term The Reynolds number can be calculated for the flow through the upstream piping using the following equation:

$$\text{Re}_{Di} = \frac{4Q}{\pi D_i v}$$

Where:

Q=volume flow rate through upstream piping $D_i$=actual inside diameter of pipe v=kinematic viscosity of fluid term For example, a piping system is made of 0.5 inch (1.3 cm) schedule 80 polyvinyl chloride ("PVC"). A 0.5 inch (1.3 cm) ball valve is used to regulate the flow of water through the system. If a valve coefficient ($C_v$) value of 10.4 is desired, what size orifice should be machined in the insert that is placed upstream of the spherical control element?

The Reynolds number through the upstream piping ($\text{Re}_{Di}$) can be calculated by using the equation:

$$\text{Re}_{Di} = \frac{4 \left( 40.04 \frac{\text{in}^3}{s} \right)}{\pi (0.546 \text{ in}) \left( 0.00135 \frac{\text{in}^2}{s} \right)}$$

Where:

Q=volume flow rate through upstream piping:
    $C_v$=10.4=10.4 gpm=40.04 in$^3$/s When water is used for the fluid, the volume flow rate is equal to the valve coefficient from the equation:

$$C_v = \frac{Q}{\sqrt{\Delta p}}$$

Where:

$C_v$=valve coefficient

Q=volume flow rate $\Delta$p=pressure drop through valve passage

By definition, the valve coefficient is the number of U.S gallons per minute that will pass through a valve passage with a pressure drop of one PSI. Using reference texts:

$D_i$=actual inside diameter of 0.5 inch (1.3 cm) schedule 80 pipe:
    =0.546 inches (1.387 cm)

v=kinematic viscosity of fluid term:
    =0.00135 in$^2$/s (0.0087 cm$^2$/s)@ 80° F.

Performing the calculation above yields:

$$\text{Re}_{Di} = 69{,}200$$

The third-order polynomial equation can now be used to calculate the Reynolds number through the orifice insert ($\text{Re}_{do}$):

$$\text{Re}_{do} = 4 \times 10^{-11} (69{,}200)^3 -$$
$$1 \times 10^{-5} (69{,}200)^2 + 1.756(69{,}200) + 9687.80$$

or, $$\text{Re}_{Do} = 86{,}987$$

Substituting into the equation for the Reynolds number through the orifice insert ($\text{Re}_{do}$) yields:

$$86{,}987 = \frac{4 \left( 40.04 \frac{\text{in}^3}{s} \right)}{\pi (d_o) \left( 0.00135 \frac{\text{in}^2}{s} \right)}$$

Rearranging and solving for the orifice diameter gives:

$$d_o = \frac{4Q}{\pi \text{Re}_{do} v} = \frac{4 \left( 40.04 \frac{\text{in}^3}{s} \right)}{\pi (86{,}987) \left( 0.00135 \frac{\text{in}^2}{s} \right)}$$

or, $$d_o = 0.434 \text{ inches } (1.102 \text{ cm})$$

Thus, an insert with an orifice diameter of 0.434 inches (1.102 cm) will provide the user with the desired valve coefficient $C_v$ of about 10.4.

FIGS. 9 through 13 show the use of a second embodiment 2.50 of the ball valve insert of the present invention being used with a non-threaded ball valve 2.20. This second embodiment 2.50 is substantially the same as the first embodiment 50 except that the second embodiment 2.50 does not have circumferential threads 52 around flange 58, and second embodiment 2.50, being unthreaded, does not require alignment/insertion/removal holes (corresponding to holes 54 of insert 50) in the face of flange 2.58. Insert 2.50 is placed within the inlet 2.22 of valve 2.20 and is soldered into the valve body. After the insert 2.50 has been soldered into the valve body, the pipes P are then soldered into the inlet and outlet ports in the usual manner. Again note however, as seen best in FIG. 10, that the rear face 2.62 of elongated rear section 2.60 must not extend too far rearwardly because otherwise it might contact ball 2.30 when the ball 2.30 is rotated so as to close the valve, as shown in dotted outline. It has been found that the small gap or chamber 2.64 between the rear face of insert 2.50 and ball 2.30 when the valve is in the opened position does not substantially impair the performance of the valve.

The metal construction of inserts 50 and 2.50 permits the inserts to be used in harsh temperatures and pressures, as is often encountered when steam is flowing through ball valves. Furthermore, the rigid securing by threads 52 or soldering of the insert into the valve body, and the metal construction of the insert, produces a structure that is substantially "blow out proof".

It has been found that the inserts of the present invention, while preferably being located in the inlet or upstream port, can be used bi-directionally (i.e., in either the inlet or the outlet ports of the ball valve) with only slightly different resulting $C_v$ when the insert is used in the downstream or outlet port of the valve.

An important feature of the inserts of the present invention is that, unlike prior art inserts, they are readily usable in standard ball valves because of the threaded securing into the ball valve (or the soldered securing, as appropriate for non-threaded ball valves), and do not require specially-made ball valves for their use. Because of this feature, the inserts are "field retrofittable" and can be retrofitted into an already-installed system without having to replace the valve. For example, as an HVAC system ages, the flow characteristics of the piping change because of corrosion or deposit buildup, etc., within the piping. The present invention can be simply and easily used to modify the $C_v$ of an aging HVAC system by exchanging one insert, having a first selected diameter for bore 56 (or 2.56, as appropriate) with a different insert, having a different selected bore diameter, thereby changing the $C_v$ of the system to a modified value in accordance with the equations discussed hereinabove. As another example, a HVAC system could be modified after installation to have a desired $C_v$ simply by choosing one of a set of inserts 50 (or 2.50, as appropriate), where the set of inserts has a range of bore diameters that allow a range of $C_v$ to be specified. This flexibility permits a given valve size to have a multiple number of possible $C_v$ settings lower than the maximum valve capacity, simply by changing the insert.

Although the present invention has been described and illustrated with respect to a preferred embodiment and a preferred use therefor, it is not to be so limited since modifications and changes can be made therein which are within the full intended scope of the invention.

I claim:

1. An improved valve having:
   (a) a valve body, said valve body having an inlet port and an outlet port;
   (b) a ball having a first axis and being interposed whiting said valve body between said inlet port and said outlet port, said ball having a first bore therethrough transverse to said, first axis ball being mounted for rotation about said first axis between a closed position, in which said inlet port and said outlet port are not in communication through said first bore, and an open position in which said inlet port and said outlet port are in communication through said first bore;
   wherein the improvement comprises a calibrated flow insert secured within one of said ports, said insert being substantially cylindrically symmetric about a second axis and having an orifice therethrough in substantial axial alignment with said second axis, said insert being mounted within said valve body such that said orifice is in substantial alignment with said first bore when said ball is in said opened position; and in which:

said inlet port has an volume flow rate Q;
   said inlet port is fed by upstream piping having an inner diameter of $D_i$;
   a fluid flowing from said upstream piping through said inlet port and through said orifice of said insert has a kinematic viscosity v;
   said fluid flowing through upstream piping has a first Reynolds number $Re_{Di}$ defined by the equation:

$$Re_{Di} = \frac{4Q}{\pi D_i v}$$

said fluid flowing through said orifice of said insert has a second Reynolds number $Re_{do}$ that is a certain function of said first Reynolds number $Re_{Di}$ with said certain function being specified by a best fit curve graphed in FIGS. 6, 7, and 8 for said inner diameter $D_i$;
   and said orifice of said insert has a diameter $d_o$ determined using the formula:

$$d_o = \frac{4Q}{\pi Re_{do} v}.$$

2. The improved valve as recited in claim 1, in which said inlet port has internal threads and said insert further comprises:
   (a) a circumferentially-threaded flange in threaded engagement with said internal threads of said inlet port; and
   (b) an elongated cylindrical portion extending rearwardly from said flange.

3. The improved valve as recited in claim 1, in which said insert further comprises:
   (a) a flange being soldered into said inlet port; and
   (b) an elongated cylindrical portion extending rearwardly from said flange.

4. The improved valve as recited in claim 1, in which said inner diameter $D_i$ is between about 0.5 and 0.75 inches, inclusive, and said certain function is defined by the formula:

$$Re_{do} = 4 \times 10^{-11}(Re_{Di})^3 - 1 \times 10^{-5}(Re_{Di})^2 + 1.756(Re_{Di}) + 9687.80$$

5. The improved valve as recited in claim 4, in which said inlet port has internal threads and said insert further comprises:
   (a) a circumferentially-threaded flange in threaded engagement with said internal threads of said inlet port; and
   (b) an elongated cylindrical portion extending rearwardly from said flange.

6. The improved valve as recited in claim 1, in which said inner diameter $D_i$ is substantially one inch, and said certain function is defined by the formula:

$$Re_{do} = -2 \times 10^{-6}(Re_{Di})^2 + 1.32(Re_{Di}) + 18983.$$

7. The improved valve as recited in claim 6, in which said inlet port has internal threads and said insert further comprises:
   (a) a circumferentially-threaded flange in threaded engagement with said internal threads of said inlet port; and (b) an elongated cylindrical portion extending rearwardly from said flange.

8. The improved valve as recited in claim 1, in which said inner diameter $D_i$ is between about 1.25 to 2.0 inches, inclusive, and said certain function is defined by the formula:

$$\text{Re}_{do} = 3 \times 10^{-12}(\text{Re}_{Di})^3 - 3 \times 10^{-6}(\text{Re}_{Di})^2 + 1.51(\text{Re}_{Di}) + 21643.$$

9. The improved valve as recited in claim 8, in which said inlet port has internal threads and said insert further comprises:

(a) a circumferentially-threaded flange in threaded engagement with said internal threads of said inlet port; and (b) an elongated cylindrical portion extending rearwardly from said flange.

* * * * *